United States Patent [19]
White, Jr.

[11] Patent Number: 4,950,311
[45] Date of Patent: Aug. 21, 1990

[54] HEATERLESS ADSORPTION SYSTEM FOR COMBINED PURIFICATION AND FRACTIONATION OF AIR

[76] Inventor: Donald H. White, Jr., 923 Alfred La., Homer, N.Y. 13077

[21] Appl. No.: 334,915

[22] Filed: Apr. 6, 1989

Related U.S. Application Data

[63] Continuation-in-part of Ser. No. 164,816, Mar. 7, 1988, abandoned.

[51] Int. Cl.$^5$ ............................................. B01D 53/04
[52] U.S. Cl. ........................................ 55/25; 55/31; 55/33; 55/58; 55/62; 55/68; 55/74; 55/75
[58] Field of Search ................... 55/25, 26, 31, 33, 58, 55/62, 68, 74, 75, 161–163, 179, 387, 389, 71, 72

[56] References Cited

U.S. PATENT DOCUMENTS

| | | | |
|---|---|---|---|
| 1,936,078 | 11/1933 | Adamson | 55/72 |
| 2,910,139 | 10/1959 | Matyear, Jr. | 55/31 X |
| 2,920,050 | 1/1960 | Blacet et al. | 55/74 X |
| 2,920,051 | 1/1960 | Wiig et al. | 55/74 X |
| 2,944,627 | 7/1960 | Skarstrom | 55/26 |
| 3,061,992 | 11/1962 | Russell | 55/31 |
| 3,150,942 | 9/1964 | Vasan | 55/31 |
| 3,237,377 | 4/1962 | Skarstrom | 55/25 |
| 3,533,221 | 10/1970 | Tamura | 55/33 |
| 3,594,984 | 7/1971 | Toyama et al. | 55/33 |
| 3,719,025 | 3/1973 | Heinze et al. | 55/31 |
| 3,789,580 | 2/1974 | Allemang et al. | 55/71 |
| 3,923,477 | 12/1975 | Armond et al. | 55/25 |
| 4,013,429 | 3/1977 | Sircar et al. | 55/33 |
| 4,100,421 | 7/1978 | Tabata et al. | 55/31 X |
| 4,168,149 | 9/1979 | Armond et al. | 55/21 |
| 4,203,958 | 5/1980 | Snarski | 55/25 X |
| 4,233,038 | 11/1980 | Tao | 55/33 |
| 4,264,340 | 4/1981 | Sircar et al. | 55/33 X |
| 4,326,858 | 4/1982 | Benkmann | 55/33 X |
| 4,331,455 | 5/1982 | Sato | 55/33 X |
| 4,380,457 | 4/1983 | Rathborne et al. | 55/33 |
| 4,430,306 | 2/1984 | Namba et al. | 55/31 X |
| 4,477,264 | 10/1984 | Kratz et al. | 55/33 X |
| 4,539,019 | 9/1985 | Koch | 55/33 X |
| 4,576,614 | 3/1986 | Armond et al. | 55/18 |
| 4,636,225 | 1/1987 | Klein et al. | 55/33 X |
| 4,711,645 | 12/1987 | Kumar | 55/33 X |
| 4,756,723 | 7/1988 | Sircar | 55/33 X |
| 4,801,311 | 1/1989 | Tolles | 55/71 |
| 4,802,898 | 2/1989 | Tolles | 55/71 |

FOREIGN PATENT DOCUMENTS

| | | | |
|---|---|---|---|
| 24279 | 2/1979 | Japan | 55/33 |
| 2171927A | 9/1986 | United Kingdom . | |

OTHER PUBLICATIONS

Skarstrom: "Heatless Fractionation of Gases Over Solid Adsorbents"; Recent Developments in Separation Science, vol. II, CRC Press.
Treybal: Mass-Transfer Operations; Third Edition, McGraw-Hill Book Company.
Yang: Gas Separation by Adsorption Processes; Butterworths.
Nitrogen Supply from Adsorption Systems; an Air Products Publication.
Breck: Zeolite Molecular Sieves; Structure, Chemistry and Use; John Wiley & Sons, 1974, pp. 714–719.
White, Jr.: Selecting the Right Desiccant Dryer, Machine Design, Feb. 21, 1985, pp. 143–147.

Primary Examiner—Robert Spitzer

[57] ABSTRACT

A heaterless adsorption apparatus for the purification and fractionation of an air feed in the absence of pretreating the air feed to remove moisture or other contaminants, including at least one adsorber column which has at least two adsorption zones, a first zone for the removal of water vapor or other contaminants from the feed and a second zone for the fractionation of the purified air, the column being sized so that the heat of adsorption released during adsorption of water vapor or other contaminants in the first zone is retained in the column, and the second zone sized so as to contain sufficient adsorbent to carry out the fractionation unaffected by the heat front generated by the heat of adsorption released in the first zone and to prevent breakthrough of the mass transfer front during fractionation.

16 Claims, 1 Drawing Sheet

HEATERLESS ADSORPTION SYSTEM FOR COMBINED PURIFICATION AND FRACTIONATION OF AIR

RELATED APPLICATIONS

This application is a continuation-in-part of U.S. patent application Ser. No. 164,816, filed Mar. 7, 1988, now abandoned, by Donald H. White, Jr., entitled "Heaterless Adsorption System for Combined Purification and Fractionation of Air."

BACKGROUND OF THE INVENTION

1. Field of the Invention

This invention relates to a regenerative adsorption column and, more particularly to a combined heaterless pressure-swing and purge sweep adsorption apparatus and process for the combined and sequential purification and fractionation of air in a single multi-zone column.

2. Description of the Prior

Two types of known heaterless adsorption systems for producing a product gas from a mixed gas feed are the pressure-swing adsorption system and the purge-sweep adsorption system. The two systems differ primarily in the method by which their adsorbent beds are regenerated.

Pressure-swing adsorption, or PSA, is described in Skarstrom U.S. Pat. No. 2,944,627 and has become known as the Skarstrom cycle. The Skarstrom cycle operates between an elevated adsorption pressure and a lower desorption pressure and is an essentially isothermal process that uses the heat generated on adsorption at the elevated pressure to do the work of desorption at the reduced pressure, ambient or vacuum. In pressure-swing adsorption, a purge serves to transport the heat of adsorption into the contaminated region of the adsorbent bed and to adsorb from the bed the contaminant vapors released by evaporation. The purge is not cooled in the process so the quantity of purge required to adsorb the liberated contaminant vapors is minimized. Thus, in pressure-swing adsorption the difference in adsorbate loading is that obtained between the two different pressures at isothermal conditions. Short cycles and low throughput per cycle ensure conservation of heat. Full regeneration is ensured by maintaining the volume of purge gas at least equal to the volume of feed ga at their different pressures.

In a purge-sweep system the heat of adsorption is not conserved. On regeneration, the heat required to desorb is supplied by the purge, which lowers the purge gas temperature, and thus decreases the capacity of the purge to sweep away contaminants. To compensate for the diminished capacity of the purge to desorb the adsorbent, the purge flow rate is increased. Regeneration of the adsorbent in a purge-sweep system therefore requires significantly more purge gas than does regeneration in a PSA system.

Heaterless systems are used for a wide variety of gas separations, either to purify gases or to enrich them in selected components. Such separations include, for example, the dehydration of air, the removal of contaminants, such as carbon monoxide, carbon dioxide and the like, from air, and the enrichment of argon in air, nitrogen in air, and oxygen in air.

In the fractionation of air to produce oxygen and nitrogen, water and carbon dioxide are regarded as impurity components of the air feed and are thus advantageously removed from air prior to fractionation or enrichment. It is particularly desirable to fractionate dehydrated air due to the well known improvement in oxygen recovery based on the fractionation of dehydrated air as opposed to humid air. For example, use of dehydrated air can result in as high as 30% more oxygen recovery. It may also be desirable to remove various other contaminants often found in the air feed.

Various methods have been employed to pretreat compressed air feed prior to oxygen, or nitrogen, enrichment. For example, heaterless adsorbers such as those operating on the Skarstrom cycle, have been used to remove moisture and other contaminants from the air feed. The pretreated air may then be fractionated, for example, in another heaterless adsorber column with adsorbents capable of carrying out the desired separation. However, such pretreatment of the air feed is not completely satisfactory because it typically adds significant cost and complexity to the overall air enrichment system and reduces the overall efficiency of the fractionation/enrichment process due to the purge and energy consumption in the pretreatment process.

Another example of an air feedstock pretreatment process to remove moisture and other contaminants prior to fractionation is the use of a reversing heat exchanger in combination with a heaterless adsorption system, as described in U.S. Pat. No. 4,380,457. The air separation process there disclosed includes passing an air supply under pressure through a reversing heat exchanger to cool the air and deposit water in the form of ice to form cool dried air; contacting the cool dried air with an adsorbent bed to remove at least carbon dioxide to form a residue of cool carbon dioxide free air; further cooling the cool carbon dioxide free air; and rectifying or fractionating the further cooled air.

More recently, it has been attempted to combine both air feed drying and air fractionation into a single column. This is generally described in Armond et al. U.S. Pat. No. 4,168,149 and U.K. Patent Application No. GB2,171,927A. However, neither reference discloses the combined purification and fractionation of an air feed as in the present invention. For example, Armond et al. '149 discloses drying sections at the inlet ends of the beds of an adsorbent column, which may contain, for example, silica gel, activated alumina or 5A or another zeolite molecular sieve. The drying sections do not purify the air feed as the column of the present invention purifies the air feed prior to fractionation. Instead, the drying sections merely scavenge the final vestiges of moisture in the air upstream of the fractionation beds, a technique well-known to those skilled in the art.

More specifically, a pretreatment step to remove the bulk of the moisture from the air feed is necessary in both Armond '149 and the U.K. patent as is further apparent from the subsequently issued U.K. Patent Application No. 2,171,927A itself, on which Armond is a coinventor. U.K. application '927A is directed to a gas separation process which includes two adsorbent beds, each bed having a first desiccant layer capable of removing residual water vapor from the air feed subsequent to treatment of the compressed air in a heat exchanger to remove the bulk of the moisture and a second adsorbent layer capable of fractionating the air feed. The process thus includes as an essential step the pretreatment of the compressed air feed upon exit from the compressor and upstream of the adsorbent beds to remove most of the water vapor from the air. The desiccant layer thus merely scavenges any residual moisture that may remain in the air following pretreatment. Moreover, because the bulk of the water vapor is removed prior to passing through the desiccant sections of the column, neither reference discloses or teaches any recognition of the importance of controlling the advance of the heat front generated in the purification zone of a multi-zone adsorbent which can be used for the combined purification and fractionation of an air feed.

Thus, despite the efforts of the prior art, there still remains a need to provide a combined heaterless pressure-swing and purge sweep adsorption column which is capable of sequentially purifying a compressed air feed and fractionating the purified air solely within the column and which does not require pretreatment of the air feed to remove a significant portion of the moisture, or to remove other contaminants that may be present in the compressed air feed.

Accordingly, it is the principal object of this invention to provide a simplified combined heaterless pressure-swing and purge sweep adsorption system which combines both purification and fractionation of a compressed air feed into a single adsorbent column without the need for prior separate treatment of the air feed to remove moisture, or to remove other contaminants that may be present in the compressed air feed.

Another object of the present invention is to provide a method for selectively producing either oxygen or nitrogen in a combined heaterless pressure-swing and purge sweep adsorption apparatus which has at least one column having two adsorbent zones, and which is capable of sequentially purifying the air feed and fractionating the purified air solely within the column, without the necessity of removing water vapor or other contaminants from the air feed prior to its entering the adsorption column.

A further and more detailed object of this invention is to provide a method for selectively producing oxygen in a combined heaterless pressure-swing and purge sweep adsorption apparatus which has at least one column having two adsorbent zones, and which is capable of sequentially purifying air feed laden with contaminants such as chemical warfare agents or industrial gases or both by the removal therefrom of such contaminants and fractionating the purified air solely within the column, without the necessity of removing such contaminants from the air feed prior to its entering the adsorption column.

Another specific object of the invention is to reduce operating costs in a heaterless adsorption system for the purification and fractionation of air by reducing the energy required to operate a heaterless adsorption system, and to reduce the capital cost of equipment for such a system.

These and other objects and advantages of the present invention will be apparent from the detailed description of the invention. While the invention will be discussed in connection with the purification and fractionation of air to produce oxygen, it is not intended to be so limited. On the contrary, and solely by way of illustration, the invention may also be used to effectively and efficiently purify and fractionate air to produce nitrogen. Moreover, it will be appreciated that the present invention may also be used where a prior pretreatment step has been employed to remove one or more contaminants that are in the air feed, but where there remain in the air feed contaminants that have not yet been removed by a prior pretreatment. For example, where the air feed contains water and other contaminants, it may be desirable to subject the air feed to a pretreatment which will remove water, but which does not remove the other contaminants. Contaminant laden air feed may then be fed to the multi-zone column of the present invention for the sequential purification (i.e., removal of contaminant) and fractionation of the air solely within the multi-zone column of the present invention.

SUMMARY OF THE INVENTION

The present invention is predicated on the discovery that by properly sizing both the adsorbent zone for the purification of air, i.e., the removal of water or other contaminants from air, and the adsorbent zone for the fractionation of air into the selected components, both the purification zone and the fractionation zone may be combined into a single adsorbent column to provide a multi-zone heaterless adsorption column which is capable of sequentially purifying an air feed and fractionating the purified air solely within the column, without the need for separate upstream purification of the air feed to remove water vapor or other contaminants from the air prior to fractionation.

The present invention thus provides a combined heaterless pressure-swing and purge sweep adsorption system for the sequential purification and fractionation of air laden with water vapor or other contaminants which includes at least one adsorber column having at least two adsorption zones. The first zone comprises a feed purification adsorber for purifying an air feed and the second zone comprises an air fractionation adsorber for enriching a component of the air. The purification zone includes an adsorbent for adsorbing water vapor or other contaminants from the air feed to effect purification and the fractionation zone includes an adsorbent which is capable of adsorbing at least one component of the purified air feed to enrich the effluent air with the unadsorbed component. The adsorbent in both the purification zone and the fractionation zone are capable of being regenerated.

In one embodiment of the invention, the multi-zone column is sized so that the heat of adsorption released during the adsorption of water vapor or other contaminants from the air feed is retained in the column and so that on application of a volume of purge gas to the multi-zone column both the fractionation zone and the purification zone are regenerated. In addition, the second zone or fractionation adsorber, is sized so as to contain sufficient adsorbent to carry out the desired fractionation unaffected by the heat front generated by the heat of adsorption released in the first zone, or purification adsorber, and to prevent breakthrough of the mass transfer front during fractionation.

In another embodiment of the invention, the purification adsorber is sized so as to retain the heat of adsorption released during purification of the air feed so that the heat front generated in the first zone does not traverse the first zone into the second zone.

In yet another embodiment of the invention, a process for the sequential purification and fractionation of air in a single multi-zone column is provided.

In still another embodiment of the invention, a continuous process for the sequential purification and fractionation of air using a pair of multi-zone columns is provided.

DETAILED DESCRIPTION OF THE DRAWINGS

Figure 1:
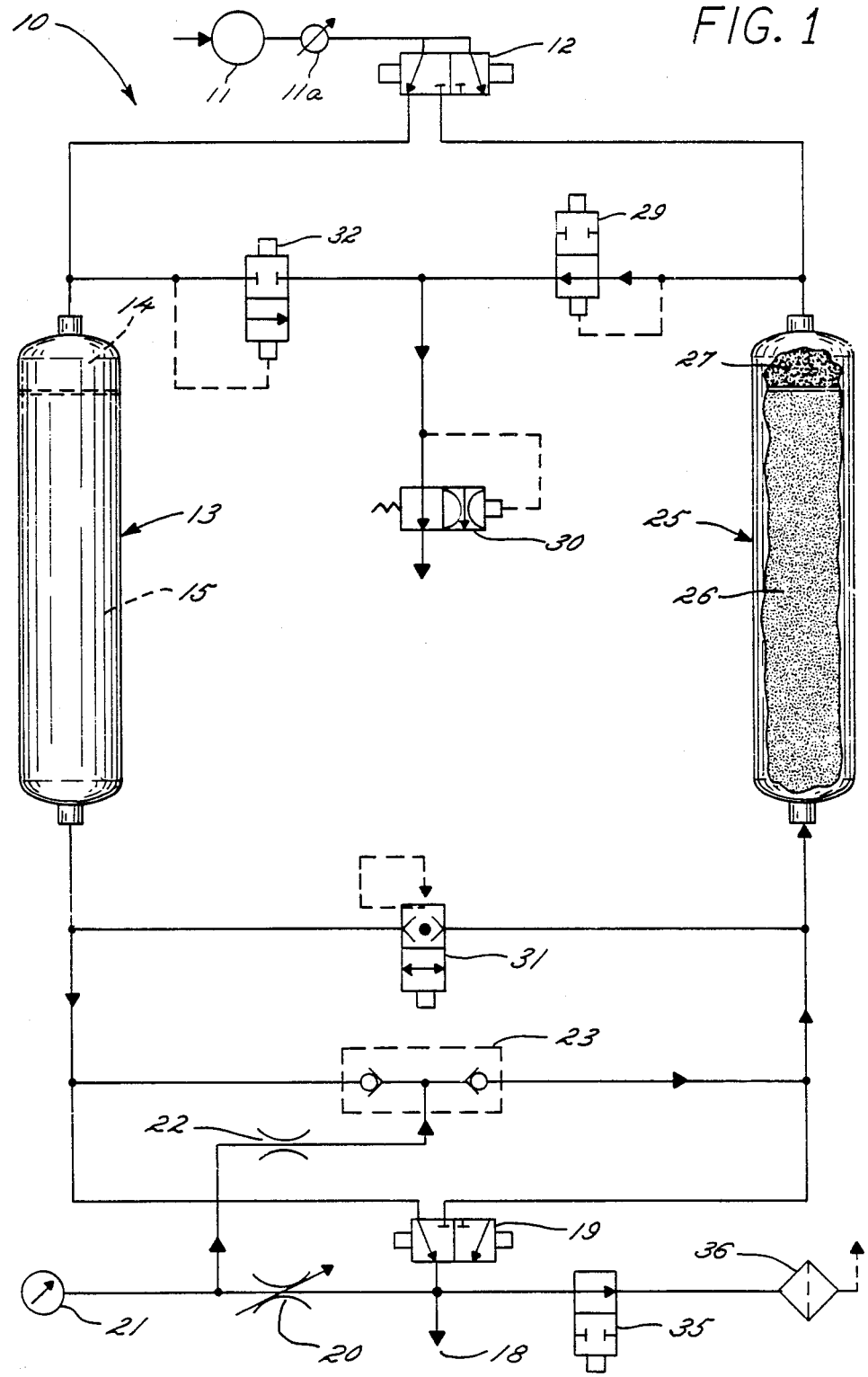

FIG. 1 is a schematic diagram of a two-column combined heaterless pressure-swing and purge sweep adsorption apparatus which incorporates the multi-zone column of the present invention for the sequential purification and fractionation of air.

DETAILED DESCRIPTION OF THE INVENTION

While the invention will be described in connection with the two-column combined heaterless pressure-swing and purge sweep apparatus depicted in FIG. 1, it will be understood that use of the multi-zone column of the present invention is not so limited. On the contrary, the multi-zone column of the present invention may be used alone and in apparatus where the column is removed for regeneration.

Referring now to FIG. 1, a combined heaterless presure-swing and purge sweep adsorption apparatus which includes a multi-zone column for the combined and sequential purification and fractionation of an air feed is shown generally at 10. Air is delivered to the combined heaterless pressure-swing and purge sweep adsorption apparatus by a compressor 11, having an aftercooler 11a. Compressed air feed enters the apparatus 10 through a 3-way inlet valve 12, which directs the air feed to a first multi-zone column 13. As illustrated, column 13 is in the adsorption cycle, that is, it stands ready to carry out purification and fractionation of the air feed.

The compressed air feed entering adsorber column 13 is first passed into the purification zone 14, which includes a regenerable adsorbent, not shown. In the purification zone 14, contaminants present in the air including, for example water vapor are adsorbed by the adsorbent to provide an effluent of purified air from the purification zone. The purified air effluent from the purification zone continues through the column to the fractionation zone 15 which includes an adsorbent, not shown, for the selective adsorption of at least one of the components of air. For example, for the production of oxygen, the adsorbent in the fractionation adsorber will be selective to nitrogen.

In keeping with the invention and as will be discussed in greater detail hereinafter, the adsorber column 13 is sized so that the heat of adsorption released in the purification zone during adsorption of the contaminants from the feed air is retained in the column 13 and so that on regeneration a volume of purge gas applied to the column 13 is sufficient to desorb the fractionation adsorbent of adsorbate and to desorb the purification adsorber of adsorbate. In addition, the fractionation zone is sized so as to prevent the mass transfer front of the adsorbate, e.g. nitrogen where the column is used to produce oxygen, from breaking through the fractionation zone into the effluent therefrom. The fractionation zone is also sized so as to contain sufficient adsorbent to carry out the desired fractionation unaffected by the heat front generated by the heat of adsorption released in the purification zone 14.

The dry air enriched in oxygen exits column 13 as product gas and is passed to outlet 18 through 3-way outlet valve 19. A portion of product gas is diverted through purge adjustment valve 20 where it is expanded to near ambient pressure. Flow indicators, pressure gauge 21 and purge orifice 22, are provided, and check valve assembly 23 directs the purge to a second multi-zone column 25. As illustrated, column 25 is on the desorption cycle, that is, it stands ready to be regenerated, having been previously used in an adsorption cycle.

Purge gas enters column 25, where it passes first through the fractionation zone 26. As illustrated, the flow of the purge gas is countercurrent to the flow during adsorption. It is assumed that the heat of adsorption in the fractionation zone was lost. The volume of purge gas supplied to the column, however, is an amount sufficient to desorb the adsorbent in the fractionation zone of the nitrogen that was adsorbed in a previous cycle and thus regenerates the adsorbent. Product gas laden with nitrogen exits the fractionation adsorbent 26 and enters the purification zone 27 where it regenerates the adsorbent, i.e., desorbs the contaminant from the adsorbent under isothermal conditions. The adsorption, desorption cycle is established so that the heat of adsorption in the purification zone is retained therein for use in desorption. Stated another way, the heat of adsorption released during the adsorption cycle in the purification zone is used with the purge to regenerate the adsorbent in the purification zone. Thus, the purification zone operates as a pressure-swing adsorber while the fractionation zone operates as a purge sweep adsorber. Exhaust gas exits column 25 and is directed through a 2-way exhaust valve 29 and flow restrictor valve 30 to exit the apparatus 10 as purge exhaust.

After an appropriate time interval, which may be fixed or variable and can be subject to microprocessor control, as is known, two-way exhaust valve 29 is closed. Column 25 is repressurized through valve 31 so that both chambers are at line pressure. Three-way inlet valve 12 directs the flow of pressurized air to column 25 where it enters purification zone 27. Flow of pressurized air to column 13 is stopped and column 13 is exhausted through depressurization valve 32. Column 13 receives purge gas through check valve assembly 23, and purge exhaust enters exhaust valve 32 to exit the apparatus 10 through flow restrictor valve 30. In this manner the enrichment and regeneration process is made continuous.

Filter change-out valve 35 and pilot air filter 36 may be provided as shown for removal of adsorbent fines in the product gas stream. This gas can then be used to control the pressure actuated valves of the system for proper control of cycle time. Proper selection of valves and equipment is well known in the art.

The adsorbents used in the purification zone and in the fractionation zone will, of course, depend on the separations desired in each zone. For the fractionation of air, adsorbents suitable for use in the purification zone must be capable of adsorbing the undesired contaminants from the air feed, especially water vapor, while the adsorbent used in the fractionation one must be capable of adsorbing the components of air not desired in the enriched effluent from the adsorber column.

Water vapor is almost always present as a contaminant in the air feed. The present invention is highly effective in removing that water vapor. It has also been found that the combined purification zone and fractionation zone-containing column of the present invention may be satisfactorily employed to remove a wide variety of other contaminants from an air feed laden with such contaminants and then fractionate the purified air solely within the column. Thus the novel multi-zone column of the present invention may be advantageously used to remove industrial contaminants, such as hydrocarbons, hydrogen sulfide, hydrogen cyanide, carbon monoxide, carbon dioxide and the like, from an air feed laden with such contaminants prior to fractionation. For example, in steel mills and wood pulp factories, hydrocarbons and sulfur compounds that may be present in the air feed would be removed in the multi-zone column by appropriate selection of the adsorbent. Similarly, in vehicular applications, such as mobile hospitals and medical emergency units, carbon dioxide and carbon monoxide present in the feed air could be removed.

The present invention may also be used for military applications, such as, for example, aircraft, hospitals and the like, to remove chemical warfare agents. Such chemical warfare agents may include, for example, phosgene, mustard gas, hydrogen cyanide, cyanogen chloride, sarin, and the like.

Adsorbents suitable for use in the adsorber column of the present invention should have a large internal porous volume, a micropore size sufficiently large to allow entrance of all of the molecules to be adsorbed by that layer of adsorbent, a large percentage of the pores in a small size range, and a high surface activity. The isotherm of the adsorbent should indicate a high capacity throughout the operating range from the inlet conditions to the desired effluent concentration levels. The adsorbent should not promote catalysis or react with the adsorbates. Also, the adsorbent must have a sufficient macropore structure to enable rapid diffusion into the adsorbent granule.

Common types of organic adsorbents include wools and cottons, activated carbons, polymeric carbons, and carbon molecular sieves. Common types of inorganic adsorbents include clays, activated aluminas, silica gels, and molecular sieves. Such adsorbents, as will be appreciated by those skilled in the art, may be suitable, depending upon the particular process parameters required and product characteristics desired for the fractionation of air.

It is likewise possible to combine more than one adsorbent in a single bed to optimize the purification and fractionation processes.

In the multi-zone column of the present invention and for the fractionation of air to produce oxygen, as well as for military applications, and the removal of chemical warfare agents from an air feed and subsequent fractionation to produce oxygen, the preferred adsorbent for the purification zone is type 13X molecular sieve, while the preferred adsorbent for the fractionation zone is type 5A-MG molecular sieve, a high purity 5A molecular sieve product.

Proper sizing of the adsorbent zones in the multi-zone column of the present invention is particularly important for carrying out the sequential purification and fractionation of air solely within the column without upstream pretreatment of the air feed to remove moisture. Thus the multi-zone column is sized so that the heat of adsorption released during the adsorption of water vapor from the air feed is retained in the column and so that on application of purge gas to the column both the fractionation adsorbent and the purification adsorbent are regenerated, i.e., desorbed of adsorbate. In addition, the fractionation zone is sized so as to contain sufficient adsorbent to carry out the desired fractionation unaffected by the heat front generated by the heat of adsorption released in the purification zone and to prevent breakthrough of the mass transfer front during fractionation.

Turning first to the fractionation zone, its length must be sufficient to prevent the mass transfer front of the adsorbed air components from breaking through into the effluent stream during fractionation. The bed length of the fractionation zone required to prevent breakthrough of the mass transfer front may be calculated according to the following relationship:

$$L = \frac{\tau \rho_o Q}{\rho_b A_x} \left(\frac{W}{M}\right) + \left(\frac{M}{M_b}\right)(C H_d)$$

wherein:

$\tau$ is the adsorption time of the cycle;
$\rho_o$ is the standard density of the exudate component;
Q is the flowrate of the exudate:
$\rho_b$ is the bulk density of the adsorbent;
$A_x$ is the cross sectional area of the fractionation zone;
W is the solute ratio, $N_2/O_2$;
M is the adsorbent equilibrium capacity for the adsorbate;
$M_b$ is the adsorbent equivalent capacity for the adsorbate;
C is the concentration reduction factor: $C=(\sqrt{N}-\sqrt{NT})^2$;
$H_d$ is the mass transfer unit height $=(H_{ds}+H_{df})1.2$ where:
  $H_{ds}$ is the solid phase unit height $=U_o D_p^2/D_f$ and;
  $U_o$ is the effective superficial velocity: 2.5 Q W $\rho_o/(M \rho_b A_x)$, where W $\rho_o$, M, $\rho_b$, $A_x$ are as defined above;
  $D_p$ is the mean particle diameter of the adsorbent;
  $D_f$ is the fluid diffusivity;
  $H_{df}$ is the fluid phase unit height:

$$H_{df} = \frac{(Sc)^{.667}}{a(.61\,\psi)} \left[\frac{10\,D_p(Q/A_x)\,\rho_o}{\mu\,(1-\epsilon)\,\psi}\right]^{.41},$$

where:
Sc is the Schmidt number;
a is the external particle area of the adsorbent;
$\psi$ is the particle shape factor of the adsorbent;
Dp is the mean particle diameter of the adsorbent;
Q is the exudate flowrate, as above;
$\mu$ is the fluid viscosity; and
$\epsilon$ is the bed bulk void fraction of the fractionation zone.

In the multi-zone column of the present invention, the fractionation zone operates as a purge-sweep adsorber. Due to the very high rate of adsorption of either the nitrogen or the oxygen component, the heat released on adsorption of either nitrogen or oxygen is not retained in the fractionation zone, but is lost through the effluent stream. Because little, if any heat of adsorption is retained in the fractionation zone, the purge required to regenerate the fractionation adsorbent is greater than the purge required to regenerate the purification adsorbent. The purge requirement for regeneration of the fractionation zone is thus determinative of the overall purge requirement for the multi-zone column.

However, it will be recognized that the purge applied to the multi-zone column must be sufficient not only to regenerate the adsorbent in the fractionation zone but must also be sufficient to regenerate the adsorbent in the purification zone as well. To insure that there is sufficient volume of purge applied to the column on the regeneration cycle to regenerate both zones the minimum required purge may be calculated according to the following function:

$$Q_p(Req) = Q_f(\tau_a/\tau_p)(P_{V1}/P_{V3})\left(\frac{P_3 - P_{V3}}{P_1 - P_{V1}}\right)(Z_1/Z_3)$$

where:

$Q_p$ is the volume of purge required to regenerate the purification zone;
$Q_f$ is the inlet flowrate;
$\tau_a$ is the adsorption time for the adsorption cycle;
$\tau_p$ is the purge time for the regeneration cycle;
$P_{V1}$ is the vapor pressure at the inlet of the pressure-swing (purification) adsorber;
$P_{V3}$ is the purge exhaust vapor pressure at the outlet of the pressure-swing (purification) adsorber;
$P_3$ is the average purge backpressure;
$P_1$ is the inlet line pressure;
$Z_1$ is the compressibility factor ratio at the inlet pressure; and
$Z_3$ is the compressibility factor ratio at the purge pressure.

The purge ratio, that is, the ratio of the actual volume of purge applied to the column to the volume of purge required to regenerate the purification zone, must be at least 1:1.

A purge ratio of 1:1 is also required in the fractionation zone to achieve successful regeneration. However, it will be appreciated that the purge requirement for the fractionation zone is higher than that of the purification zone because of the lower purge temperatures in the fractionation zone. The lower purge temperature is a result of the desorption process and the fact that the heat of adsorption is not retained in the fractionation zone. As a result, purge vapor pressure $P_{V3}$ at the purge outlet from this section is lowered. In a purge sweep process the purge outlet vapor pressure is about two-thirds the outlet vapor pressure typically achieved in a pressure swing adsorption system operating on the Skarstrom cycle. Thus, the purge required in the fractionation zone is about one and one-half times the purge required in the purification zone.

The purification zone operates as a heaterless pressure-swing adsorber. That is, the purification zone is advantageously sized so that the heat of adsorption, primarily due to adsorption of water, is preferably completely retained in the purification zone. To that end, then, the length of the purification zone will be dependent on the nature of the gas passed through the zone as well as the nature of adsorbent used. In the sequential purification and fractionation of air in a single, multi-zone column, the bed length required to retain the heat of adsorption in the purification zone is calculated using the following formula:

$$L = U_o \times (\rho \times C_p)\left[\frac{c}{h\,a} + \frac{\tau}{C_{Pd}\rho_b} + 2\sqrt{\frac{c\,\tau}{h\,a\,C_{pd}\rho_b}}\right]$$

wherein:
$U_o$ is the superficial air velocity;
$\rho$ is the density of air at operating conditions;
$C_p$ is the specific heat of air;
c is the temperature reduction factor: $c=(\sqrt{N}-\sqrt{NT})^2$;
h is the heat transfer coefficient;
a is the external surface area of the adsorbent;
$\tau$ is the adsorption time for the adsorption cycle;
$C_{pd}$ is the heat capacity of the adsorbent; and
$\rho_b$ is the bulk density of the adsorbent.

While the multi-zone column will not be rendered inoperative if the heat released upon the adsorption of water is not retained completely in the purification zone, but instead traverses into the fractionation zone, that manner of operation has a disadvantage relative to the preferred technique. Specifically, if the heat of adsorption is allowed to pass into the fractionation adsorbent the resulting temperature increase in the fractionation zone reduces the capacity of the adsorbent therein to adsorb and retain adsorbate, whether it be nitrogen or oxygen. If the fractionation zone itself is long enough, however, then the adsorbate mass transfer zone can be located in the fractionation zone beyond the heat front from the heat of adsorption from the purification zone, a location in the fractionation zone where it is cooler and the capacity of the adsorbent is not adversely affected. It will be appreciated however, that upon regeneration the heat of adsorption that traverses into the fractionation zone must be carried by counter-current purge gas to the purification zone to effect complete and efficient regeneration of the adsorbent in the purification zone.

Since the fractionator adsorbent capacity for nitrogen or oxygen may be adversely affected by heat, as discussed above, the purification zone is preferably sized to retain all of the heat of adsorption released during purification of the air feed so that the heat front generated in the purification zone does not traverse the purification zone into the fractionation zone. To minimize the adverse effect of loss of fractionation adsorbent capacity due to heat traversal, if any, from the purification zone into the fractionation zone which may occur, especially when the feed air is excessively high in moisture content, the fractionation zone may also be oversized somewhat. By doing so, the desired fractionation is carried out in the fractionation zone above the heat front and is thus unaffected by the heat front generated by the heat of adsorption released in the purification zone.

The following Example illustrates the improved energy efficiency using the multi-zone column of the present invention to produce oxygen from air in comparison to using separate pressure-swing adsorbers for first removing the water vapor from the air feed and subsequently fractionating the air feed into oxygen.

The data are as follows:

|  | PSA Dryer | $O_2$ Generator |
|---|---|---|
| A. Production of oxygen using a separate PSA dryer and oxygen generator. | | |
| Chamber inside dia. | 0.8854 ft.$^2$ | 0.8854 ft.$^2$ |
| Adsorbent bed length | 4.0 ft. | 4.0 ft. |
| Adsorbent | 13X Mol Sieve | 5A-MG Mol Sieve |
| Adsorbent Particle Size | ⅛ in. bead | 16 × 40 mesh gran. |
| Inlet flow rate | 110 scfm | 80 scfm |
| Inlet pressure | 104.7 psia | 46.7 psia |
| Inlet temperature | 80° to 100° F. | 80° to 100° F. |
| Adsorption time/cycle | 1.133 min. | 0.40 min. |
| Purge time/cycle | 1.050 min. | 0.33 min. |
| Outlet flowrate | 80 scfm | 3.75 scfm $O_2$ |
| Effluent quality | < −100° F. dew pt. | 95% $O_2$ |

B. Production of oxygen using the multi-zone column of the present

-continued

|  | PSA Dryer | O₂ Generator |
|---|---|---|
|  | invention. |  |
| Chamber inside dia. | 0.8854 ft. |  |
| Purification zone length | 0.50 ft. |  |
| Fractionation zone length | 4.0 ft. |  |
| Purification zone adsorbent | ⅛" beaded 13X Mol. Sieve |  |
| Fractionation zone adsorbent | 16 × 40 mesh 5A-MG Mol. Sieve |  |
| Inlet flowrate | 80 scfm |  |
| Inlet pressure | 46.7 psia |  |
| Adsorption time/cycle | 0.40 min. |  |
| Purge time/cycle | 0.333 min. |  |
| Outlet flowrate | 3.75 scfm O₂ |  |
| Effluent quality | 95% O₂ |  |

A comparison of the energy requirements for the separate purification/fractionation system and the single multi-zone column purification/fractionation system of the present invention is set forth below. The fluid horsepower requirements to carry out the purification and fractionation were calculated using the following formula:

Fluid Horsepower =

$$4.364 \times 10^{-3} P_a Q \left( \frac{N \cdot \eta}{\eta - 1} \right) \left[ \left( \frac{P_d}{P_a} \right)^{\frac{\eta-1}{N \cdot \eta}} - 1 \right]$$

where:
$P_a$ is the compressor inlet pressure;
N is the number of compressor stages;
$\eta$ is the polytropic process constant;
$P_d$ is the discharge pressure; and
Q is the flowrate The energy requirement (in kilowatts) to carry out the purification and fractionation was calculated on the basis of the fluid horsepower according to the following formula:

kW (Input) = fluid horsepower × 0.7457/Eff.

where Eff. is the overall efficiency.

The values for each of $P_a$, N, $\eta$, Q, $P_d$ and Eff. and the fluid horsepower and kilowatt hour input requirement for the separate system and the multi-zone column are set forth in Table I below:

TABLE I

|  | Separate System | Multi-zone Column |
|---|---|---|
| $P_a$ | 14.7 | 14.7 |
| N | 1 | 1 |
| $\eta$ | 1.3 | 1.3 |
| Q (SCFM) | 110 | 80 |
| $P_d$ | 104.7 | 46.7 |
| Eff | 0.62 | 0.62 |
| Fluid H.P. | 17.53 | 6.80 |
| kW | 21.08 | 8.18 |

The example demonstrates the advantages of the multi-zone column of the present invention for the sequential purification and fractionation of air to produce oxygen over the separate purification and subsequent fractionation of air to produce oxygen. The data demonstrate that the overall size of the multi-zone column of the present invention is only slightly greater than one-half that of the separate system, namely 4.5 feet in length overall to 8.0 feet in length overall. Moreover, the energy requirement for the multi-zone column is substantially less: only 8.18 kW required as opposed to 21.08 kW required for the separate system. The example further demonstrates that the multi-zone column can be used efficiently and effectively for the sequential purification and fractionation of air in the absence of separate upstream pretreatment of the air to lower its moisture content.

I claim:

1. A process for the sequential purification and fractionation of air in a single column and in the absence of pretreating the air feed to remove moisture comprising passing an air feed containing a gaseous component harmful to humans through an adsorber column to produce product effluent, said column having at least two adsorption zones, said column having a first zone comprising a feed purification adsorber for purifying an air feed and having a first adsorbent therein for adsorbing the harmful gaseous component and water vapor from said feed to effect purification, said first adsorbent capable of being regenerated, and a second zone comprising an air fractionation adsorber for adsorbing at least one component of air and having a second adsorbent therein to effect fractionation of air, said second adsorbent capable of being regenerated, said first zone operating as a heaterless pressure-swing adsorber and said second zone operating as a purge sweep adsorber, said column being sized so that the heat of adsorption released during the adsorption of water vapor from the air feed is retained in said column and so that on application of a volume of purge gas to said column said first and second adsorbents are both regenerated, said second zone being sized so as to contain sufficient adsorbent to carry out the fractionation unaffected by the heat front generated by the heat of adsorption released in the first zone and to prevent breakthrough of the mass transfer front during fracitonation, and removing the product effluent from said column.

2. The process of claim 1 wherein said first zone is sized so as to retain the heat of adsorption released during the adsorption of water vapor from the feed air.

3. The process of claim 1 wherein said adsorbent in said first zone is type 13× molecular sieve.

4. The process of claim 1 wherein said adsorbent in said second zone is type 5A-MG molecular sieve.

5. A continuous process for the sequential purification and fractionation of an air feed containing a gaseous component harmful to humans in a single column and in the absence of pretreating the air feed to remove moisture comprising alternately repeating an adsorption cycle and a desorption cycle in each of at least two adsorber columns, each of said columns having a first zone comprising a feed purification adsorber for purifying an air feed and having a first adsorbent therein for adsorbing the harmful gaseous component and water vapor from said feed to effect purification, said first adsorbent capable of being regenerated, and a second zone comprising an air fractionation adsorber for adsorbing at least one component of air and having a second adsorbent therein to effect fractionation of air, said second adsorbent capable of being regenerated, said first zone operating as a heaterless pressure-swing adsorber and said second zone operating as a purge sweep adsorber, said column being sized so that the heat of adsorption released during the adsorption of water vapor from the air feed is retained in said column and so that on application of a volume of purge gas to said column said first and second adsorbents are both regenerated, said second zone sized so as to contain sufficient adsorbent to carry out the fractionation unaffected by the heat front generated by the heat of adsorption released in the first zone and to prevent breakthrough of the mass transfer front during fractionation, said adsorption cycle comprising passing said air feed through said adsorber column where it is sequentially purified in said purification zone and fractionated in said fractionation zone to produce effluent product and removing said effluent product from said column, said desorption cycle comprising reducing the pressure of said adsorber column which has most recently undergone the adsorption cycle, applying a purge to said column to regenerate the adsorbent in both said fractionation zone and said purification zone, and removing the regeneration gas from said column.

6. The process of claim 5 wherein said first zone is sized so as to retain the heat of adsorption released during the adsorption of water vapor from the feed air.

7. The process of claim 5 wherein said adsorbent in said first zone is type 13× molecular sieve.

8. The process of claim 5 wherein said adsorbent in said second zone is type 5A-MG molecular sieve.

9. A process for the sequential purification and fractionation of an air feed laden with at least one gaseous contaminant harmful to humans in a single column and in the absence of pretreating the air feed to remove said contaminant comprising passing an air feed through an adsorber column to produce product effluent, said column having at least two adsorption zones, said column having a first zone comprising an air feed purification adsorber for purifying an air feed laden with said at least one contaminant and having a first adsorbent therein for adsorbing said contaminant from said feed to effect purification of said air feed, said first adsorbent capable of being regenerated, and a second zone comprising an air fractionation adsorber for adsorbing at least one component of air and having a second adsorbent therein to effect fractionation of air, said second adsorbent capable of being regenerated, said first zone operating as a heaterless pressure-swing adsorber and said second zone operating as a purge sweep adsorber, said column being sized so that the heat of adsorption released during the adsorption of said contaminant from the air feed is retained in said column and so that on application of a volume of purge gas to said column said first and second adsorbents are both regenerated, said second zone being sized so as to contain sufficient adsorbent to carry out the fractionation unaffected by the heat front generated by the heat of adsorption released in the first zone and to prevent breakthrough of the mass transfer front during fractionation, and removing the product effluent from said column.

10. The process of claim 9 wherein said first zone is sized so as to retain the heat of adsorption released during the adsorption of said contaminant from the feed air.

11. The process of claim 9 wherein said adsorbent in said first zone is type 13× molecular sieve.

12. The process of claim 9 wherein said adsorbent in said second zone is type 5A-MG molecular sieve.

13. A continuous process for the sequential purification and fractionation of an air feed laden with at least one gaseous contaminant harmful to humans in a single column and in the absence of pretreating the air feed to remove said contaminant comprising alternately repeating an adsorption cycle and a desorption cycle in each of at least two adsorber columns, each of said columns having a first zone comprising a feed purification adsorber for purifying an air feed and having a first adsorbent therein for adsorbing said contaminant from said feed to effect purification, said first adsorbent capable of being regenerated, and a second zone comprising an air fractionation adsorber for adsorbing at least one component of air and having a second adsorbent therein to effect fractionation of air, said second adsorbent capable of being regenerated, said first zone operating as a heaterless pressure-swing adsorber and said second zone operating as a purge sweep adsorber, said column being sized so that the heat of adsorption released during the adsorption of said contaminant from the air feed is retained in said column and so that on application of a volume of purge gas to said column said first and second adsorbents are both regenerated, said second zone sized so as to contain sufficient adsorbent to carry out the fractionation unaffected by the heat front generated by the heat of adsorption released in the first zone and to prevent breakthrough of the mass transfer front during fractionation, said adsorption cycle comprising passing said air feed through said adsorber column where it is sequentially purified in said purification zone and fractionated in said fractionation zone to produce effluent product and removing said effluent product from said column, said desorption cycle comprising reducing the pressure of said adsorber column which has most recently undergone the adsorption cycle, applying a purge to said column to regenerate the adsorbent in both said fractionation zone and said purification zone, and removing the regeneration gas from said column.

14. The process of claim 13 wherein said first zone is sized so as to retain the heat of adsorption released during the adsorption of said contaminant from the feed air.

15. The process of claim 13 wherein said adsorbent in said first zone is type 13× molecular sieve.

16. The process of claim 13 wherein said adsorbent in said second zone is type 5A-MG molecular sieve.

* * * * *

UNITED STATES PATENT AND TRADEMARK OFFICE
CERTIFICATE OF CORRECTION

PATENT NO. : 4,950,311

DATED : August 21, 1990

INVENTOR(S) : Donald H. White, Jr.

It is certified that error appears in the above-identified patent and that said Letters Patent is hereby corrected as shown below:

ON TITLE PAGE: Item [73]
    Assignee: Pall Corporation, East Hills, New York

In the Background of the Invention:

Column 1, Line 21, add after the word "Prior" -- Art --,

Column 1, Line 48, change "ga" to -- gas --.

In the Detailed Description of the Invention:

Column 6, Line 57, change "one" to -- zone --,

Column 8, First Equation, first fraction, the denominator should have the "b" in subscript, also in legend, Column 8, Line 30, add "/" before 1.2.

Column 12, Line 35, change "fracitonation" to -- fractionation --.

Signed and Sealed this

Twenty-third Day of June, 1992

Attest:

DOUGLAS B. COMER

*Attesting Officer*      Acting Commissioner of Patents and Trademarks